(12) United States Patent
Kwon et al.

(10) Patent No.: US 7,225,552 B2
(45) Date of Patent: Jun. 5, 2007

(54) METHOD AND SYSTEM TO DETECT AN ORIENTATION OF A MOVING OBJECT

(75) Inventors: Woong Kwon, Seongnam-Si (KR); Kyung Shik Roh, Seongnam-Si (KR); Woo Sup Han, Yongin-Si (KR); Young Bo Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 11/204,347

(22) Filed: Aug. 16, 2005

(65) Prior Publication Data

US 2006/0156564 A1    Jul. 20, 2006

(30) Foreign Application Priority Data

Jan. 14, 2005    (KR) ...................... 10-2005-0003920

(51) Int. Cl.
    *G01C 17/38*    (2006.01)
    *G01C 21/00*    (2006.01)

(52) U.S. Cl. ........................................ 33/356; 33/355 R
(58) Field of Classification Search .............. 33/355 R, 33/356, 357
See application file for complete search history.

(56) References Cited

U.S. PATENT DOCUMENTS 4,989,333 A  *  2/1991  Helldorfer et al. ............ 33/356
5,165,269 A  *  11/1992  Nguyen ........................ 33/356
5,440,303 A  *  8/1995  Kinoshita ..................... 33/356
5,581,899 A  *  12/1996  Brehler et al. ................ 33/356
7,069,663 B2 *  7/2006  Kwon et al. .................. 33/356

FOREIGN PATENT DOCUMENTS

JP          11-351904      12/1999
JP          2002-090173      3/2002
KR        2003-95492 A      12/2003

* cited by examiner

*Primary Examiner*—Christopher W. Fulton
(74) *Attorney, Agent, or Firm*—Stanzione & Kim, LLP

(57) ABSTRACT

Method and system to detect orientations of a moving object using one or more magnetic compasses. The method and system minimize magnetic field interference in a space where an object is moving such that the orientations of the moving object can be precisely detected. The method includes setting one or more earth magnetic field (EMF) conditions without a magnetic field interference component to determine whether the one or more magnetic compasses are located in an EMF area, calculating a magnitude of a magnetic field applied to the moving object using the one or more magnetic field compasses, and detecting an orientation of the moving object by determining whether the calculated magnitude of the magnetic field satisfies the one or more EMF conditions.

22 Claims, 10 Drawing Sheets

: moving object position

: magnetic field interference

: earth magnetic field

METHOD AND SYSTEM TO DETECT AN ORIENTATION OF A MOVING OBJECT

CROSS-REFERENCE TO RELATED APPLICATIONS

This application claims the benefit of Korean Patent Application No. 2005-3920, filed on Jan. 14, 2005 in the Korean Intellectual Property Office, the disclosure of which is incorporated herein in its entirety by reference.

BACKGROUND OF THE INVENTION

1. Field of the Invention

The present general inventive concept relates to a method and system to detect orientations of a moving object using magnetic compasses, and, more particularly, to a method and system to minimize magnetic field interference in a space in which an object is moving such that the orientations of the moving object can be precisely detected.

2. Description of the Related Art

Generally, robots have been used for various purposes in various industrial fields. For example, moving robots (hereinafter, referred to as moving objects) that have been used indoors, such as cleaning robots, service robots, etc., must detect their orientation so that their movement may be precisely controlled.

One type of sensor for detecting the orientations of the moving object is a magnetic compass which calculates an azimuth of the moving object i.e., an absolute orientation using a direction of the Earth's magnetic field (EMF), which is always oriented toward the north pole.

A method of detecting orientations of a moving object using a magnetic compass was proposed by L. Ojeda and J. Borenstein in Proc. Of IASTED Int. Conf. Robotics and Applications, Honolulu, Hi., 2000 entitled "Experimental results with the KVH C-100 Fluxgate Compass in Mobile Robots."

Figure 1:
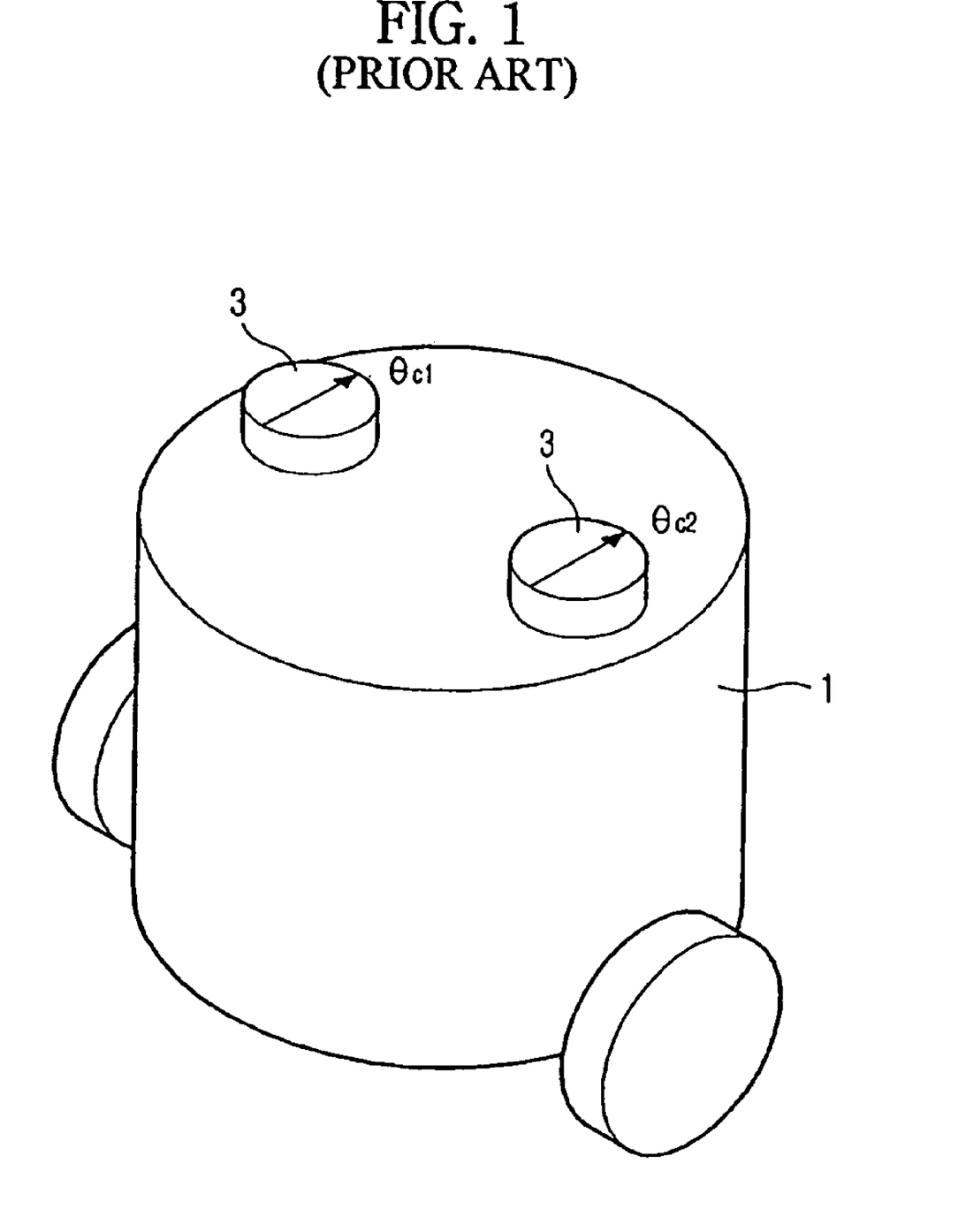
FIG. 1 is a perspective view illustrating a moving object having magnetic compasses installed thereon.
Figure 2:
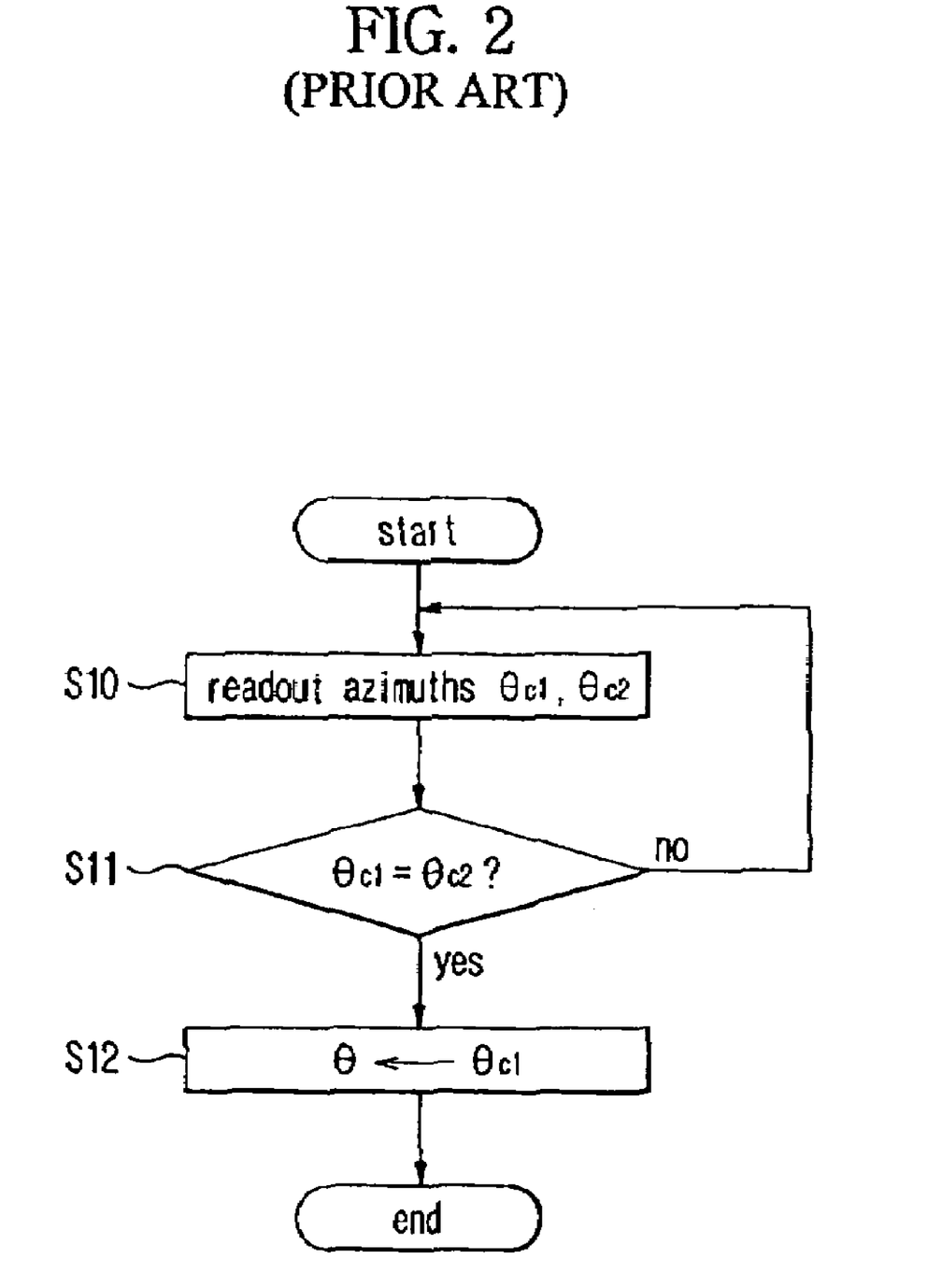
FIG. 2 is a flowchart illustrating a conventional method of detecting an orientation of the moving object of FIG. 1.

As illustrated in FIGS. 1 and 2, the method disclosed in the abovementioned document reads two azimuths $\theta_{c1}$, $\theta_{c2}$ from two magnetic compasses 3 installed on a moving object 1 in step S10, and compares the two azimuths $\theta_{c1}$, $\theta_{c2}$ with one another in step S11. If the two azimuths $\theta_{c1}$, $\theta_{c2}$ are equal to each other, a determination is made that there is no magnetic field interference in the space where the moving object is located, and accordingly, one of the two azimuths, i.e., $\theta_{c1}$, is set as an orientation $\theta$ of the moving object 1 in step S12. Otherwise, step S10 is repeated to perform the azimuth determination procedure.

Figure 3:
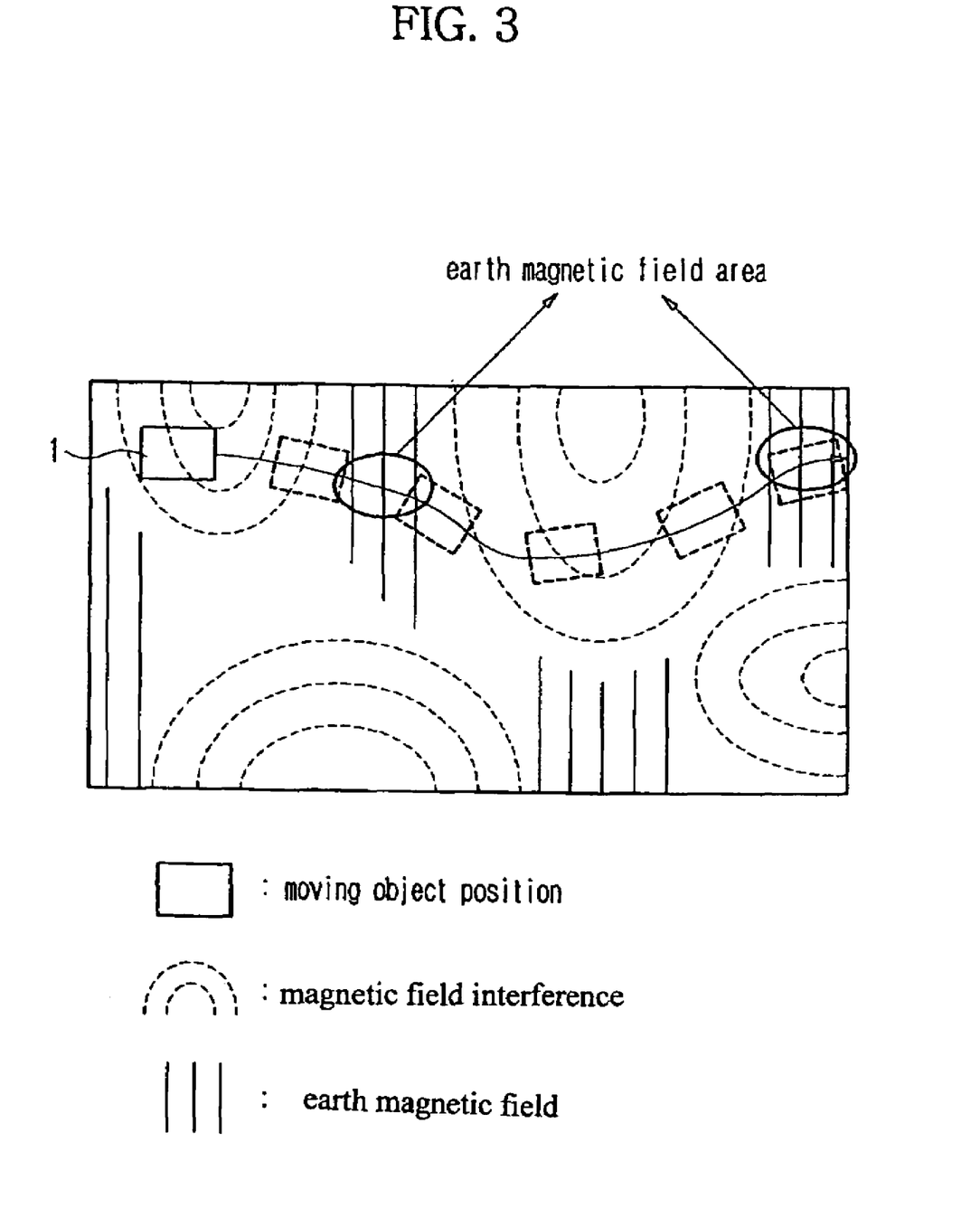
FIG. 3 is a view illustrating a trajectory of a moving object traveling through an earth magnetic field area.

However, as illustrated in FIG. 3, since there is an area where a magnetic field interference is present, within the indoor space in which the object 1 is moving, outside of an Earth's magnetic field (EMF) area, the magnetic compasses 3 cannot direct the moving object 1 north in the area of the magnetic field interference. Namely, the magnetic field interference causes interference with a determination of the earth's magnetic field in the magnetic field interference area.

In such a situation, if the two magnetic compasses 3 have the same value, a determination is made that no magnetic field interference occurs in that area, thereby causing fatal errors when determining the orientation of the moving object 1.

On the other hand, there are cases when the two magnetic compasses 3 have the same value as a result of the magnetic field interference in the magnetic field interference area. Since the value may be quite different from an azimuth of the EMF, the method of detecting the orientation of the moving object of FIG. 2 has disadvantages in that it cannot determine whether the azimuth acquired from the magnetic compasses 3 is an azimuth of the EMF or an azimuth that results from magnetic field interference.

SUMMARY OF THE INVENTION

The present general inventive concept provides a method and system to minimize a magnetic field interference in a space where an object is moving by simultaneously using information of a magnetic field and angles of one or more magnetic compasses to precisely detect an orientation of the moving object.

The present general inventive concept also provides a method and system to determine whether a current position of a moving object is in an earth magnetic field (EMF) area, and to determine an azimuth of one or more magnetic compasses installed on the moving object as an orientation of the moving object if the current position is in the EMF area.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a method of detecting an orientation of a moving object on which one or more magnetic compasses are installed. The method includes: setting one or more earth magnetic field (EMF) conditions without a magnetic field interference component to determine whether the one or more magnetic compasses are located in an EMF area, calculating a magnitude of a magnetic field applied to the moving object using the one or more magnetic compasses, and detecting an orientation of the moving object by determining whether the calculated magnitude of the magnetic field satisfies the one or more EMF conditions.

The setting of the one or more EMF conditions may include: obtaining trajectories of a horizontal component $H_x$ and a vertical component $H_y$ of a plurality of magnetic fields by rotating the one or more magnetic compasses in a plurality of corresponding positions in the EMF area, obtaining one or more parameters to approximate the trajectories as a sinusoidal curve, and calculating the one or more EMF conditions by obtaining upper and lower limits of the one or more parameters.

The one or more parameters may include amplitudes of the approximated sinusoidal curve.

The one or more EMF conditions may include a plurality of EMF conditions, and if the plurality of EMF conditions are satisfied, data of the one or more magnetic compasses are determined to be valid and the orientation of the moving object is determined accordingly. Additionally, the data of the one or more magnetic compasses is determined to be invalid if any one of the plurality of EMF conditions is not satisfied.

The one or more magnetic compasses may include two or more magnetic compasses.

The one or more EMF conditions may include a first condition set to be compared to an azimuth of the one or more magnetic compasses and the magnitude of the magnetic field of the one or more magnetic compasses and defined by the following equation (1), and a second condition set to be compared to a difference between magnitudes of the one or more magnetic compasses and defined by the following equation (2), $$(\psi_{l+}+\psi_{l-}\cos 2\theta)/2 \leq |H|^2/|H_E|^2 \leq (\psi_{u+}+\psi_{u-}\cos 2\theta)/2 \quad (1)$$

wherein, $\psi_{l+} \equiv \psi_{xl}+\psi_{yl}, \psi_{u+} \equiv \psi_{xu}+\psi_{yu}$ and $\psi_{l-} \equiv \min(\psi_{yl}-\psi_{xl},\psi_{yu}-\psi_{xu})$, $\psi_{l+} \equiv \max(\psi_{yl}-\psi_{xl},\psi_{yu}-\psi_{xu})$, and $\theta$ is an azimuth measurement value, $$(\overline{\psi}_{l+}+\overline{\psi}_{l-}\cos 2\theta)/2 \leq (|^1H|^2-|^2H|^2)/|H_E|^2 \leq (\overline{\psi}_{u+}+\overline{\psi}_{u-}\cos 2\theta)/2 \quad (2)$$

where, $\overline{\psi}_{l+} = \min(^1\psi_x - ^2\psi_x) + \min(^1\psi_y - ^2\psi_y)$, $\overline{\psi}_{u+} = \max(^1\psi_x - ^2\psi_x) + \max(^1\psi_y - ^2\psi_y)$, $\overline{\psi}_{l-} = \min(^1\psi_y - ^2\psi_y - ^1\psi_x + ^2\psi_x)$, and $\overline{\psi}_{u-} = \max(^1\psi_y - ^2\psi_y - ^1\psi_x + ^2\psi_x)$, and $\theta$ is the azimuth measurement value.

The magnitude of the magnetic field can be obtained by the following equation (3) using the one or more magnetic compasses $$|H|^2 = \left(\frac{r_x - O_x}{\hat{A}_x} \times |H_E|\right)^2 + \left(\frac{r_y - O_y}{\hat{A}_y} \times |H_E|\right)^2, \quad (3)$$

where, $\hat{A}_x$ and $\hat{A}_y$ are amplitude values, $O_x$ and $O_y$ are offset values, $r_x$ and $r_y$ are raw data values of the one or more magnetic compasses, and $|H_E|$ denotes a magnitude of the earth's magnetic field.

The foregoing and/or other aspects of the present general inventive concept are also achieved by providing a system to detect orientations of a moving object on which one or more magnetic compasses are installed. The system includes: a magnetic field condition setting unit to set one or more conditions of an earth magnetic field (EMF) without a magnetic field interference component to determine whether the one or more magnetic compasses are located in an EMF area, a magnetic field calculation unit to calculate a magnitude of a magnetic field applied to the moving object using the one or more magnetic compasses, a magnetic field area determination unit to determine whether the calculated magnitude of the magnetic field satisfies the one or more EMF conditions and to determine whether a position of the moving object is in the EMF area, and an orientation determining unit to determine an orientation of the moving object based on one or more azimuths of the one or more magnetic compasses if the position of the moving object corresponds to the EMF area.

The magnetic field condition setting unit may include: a candidate position selection unit to select one or more candidate positions in which corresponding magnetic fields have little or no magnetic field interference component, a raw data acquisition unit to obtain one or more parameters by obtaining a raw data trajectory of the corresponding magnetic fields having a horizontal component $H_x$ and a vertical component $H_y$ by rotating the one or more magnetic compasses at the one or more selected candidate positions, a candidate position determination unit to determine a current compass position as a candidate position that satisfy the one or more EMF conditions when the corresponding trajectory of raw data approximates a sinusoidal wave and to generate a candidate position group based on a result of the determination, and a condition acquisition unit to determine upper and lower limits obtained at each candidate position in the candidate position group and to determine the one or more EMF conditions.

The candidate position determination unit may compare amplitudes and offsets at each of the one or more selected candidate positions with one another and may exclude one or more candidate positions having outlier data points from the candidate position group based on a result of the comparison.

The one or more magnetic compasses may include two or more magnetic compasses.

The one or more EMF conditions may include a plurality of EMF conditions, and the EMF area determination unit determines that the position of the moving object corresponds to the EMF area without the magnetic field interference component if the magnitude of the magnetic field satisfies all of the plurality of EMF conditions, and determines that the position of the moving object does not correspond to the EMF area if the magnitude of the magnetic field fails to satisfy any one of the plurality of EMF conditions.

BRIEF DESCRIPTION OF THE DRAWINGS

These and/or other aspects of the general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

The present general inventive concept precisely and reliably detects an orientation of a moving object using a plurality of magnetic compasses.

Figure 4:
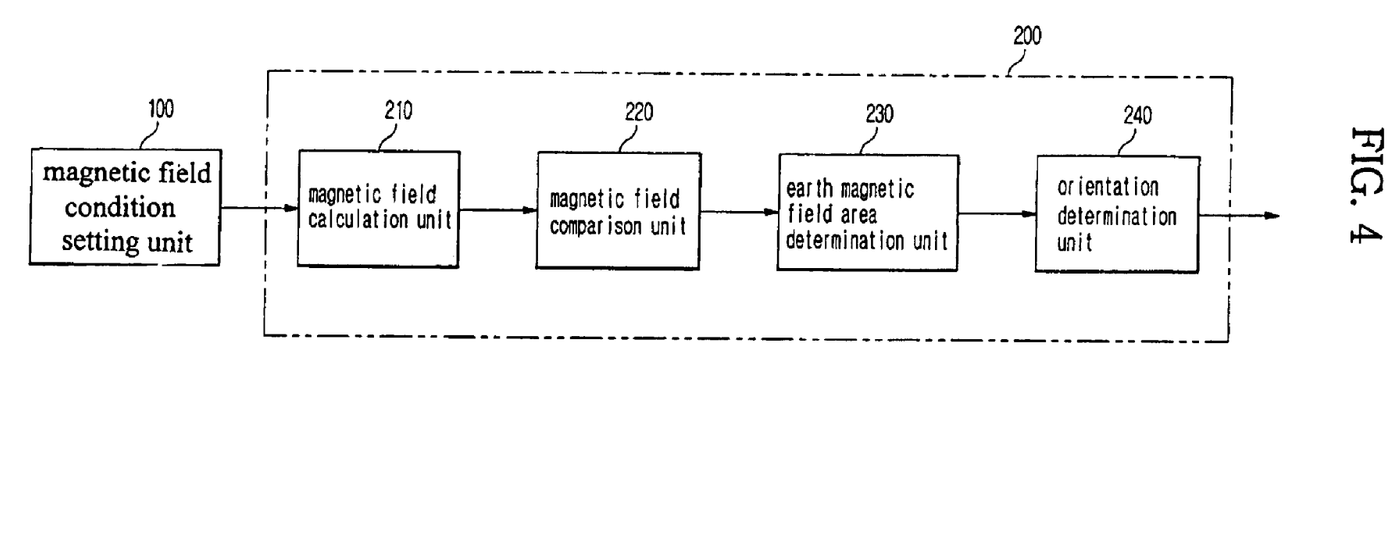
FIG. 4 is a block diagram illustrating a system to detect an orientation of a moving object according to an embodiment of the present general inventive concept.

FIG. 4 is a block diagram illustrating a system to detect an orientation of a moving object according to an embodiment of the present general inventive concept. The system includes a magnetic field determination unit 200 including a magnetic field calculation unit 210, a magnetic field comparison unit 220, an earth magnetic field area determination unit 230, and an orientation determination unit 240. Here, the magnetic field calculation unit 210, the magnetic field comparison unit 220, the earth magnetic field area determination unit 230, and the orientation determination unit 240 may perform an on-line magnetic field determination method. The system may further include a magnetic field condition setting unit 100.

The magnetic field condition setting unit 100 sets conditions of a magnetic field magnitude to perform an effective magnetic field area determination. More specifically, the magnetic field condition setting unit 100 determines conditions of the earth's magnetic field (EMF) in order to determine the effective magnetic field area for each of the plurality of compasses. The EMF conditions of the earth's magnetic field may include two or more conditions (e.g., a first EMF condition and a second EMF condition) that define one or more conditions to determine when the moving object is in an earth magnetic field (EMF) area. The EMF area refers to a space in which little or no magnetic field interference is present. The plurality of compasses may include two compasses (i.e., a first compass and a second compass). The EMF conditions are determined according to a plurality of parameters derived from data collected by the plurality of compasses.

The magnetic field calculation unit 210 calculates a magnitude of a magnetic field applied to the moving object based on raw data of the plurality of compasses installed on the moving object.

The magnetic field comparison unit 220 determines whether the calculated magnitude of the magnetic field satisfies the EMF conditions.

The earth magnetic field area determination unit 230 determines that the moving object is located in an area predominantly affected by the EMF (i.e., with little or no magnetic field interference) and is located in the EMF area when the calculated magnitude of the magnetic field satisfies the EMF conditions. On the other hand, when the calculated magnitude of the magnetic field does not satisfy the EMF conditions, the earth magnetic field area determination unit 230 determines that the moving object is located in an area where magnetic field interference is present. The magnetic field interference results from an external magnetic field that causes an interference with the earth's magnetic field. Additionally, when two or more compasses are used, and calculated magnitudes of magnetic fields of the two or more compasses all satisfy the EMF conditions, the earth magnetic field area determination unit 230 determines that the moving object is located in an area predominantly affected by the EMF with little or no magnetic field interference (i.e., the EMF area). On the other hand, if the calculated magnitudes of the magnetic fields of the compasses fail to satisfy any one of the EMF conditions, the earth magnetic field area determination unit 230 determines that the moving object is located in an area affected by magnetic field interference (i.e., a magnetic field interference area).

The orientation determination unit 240 determines whether azimuths of the plurality of compasses are valid according to whether the earth magnetic field area determination unit 230 determines that the moving object is located in the EMF area. If the moving object is located in the EMF area, the orientation determination unit 240 sets the azimuths as an orientation of the moving object.

As such, the magnetic field determination unit 200 can provide valid azimuths according to the data collected by the plurality of compasses and other sensors.

Figure 5:
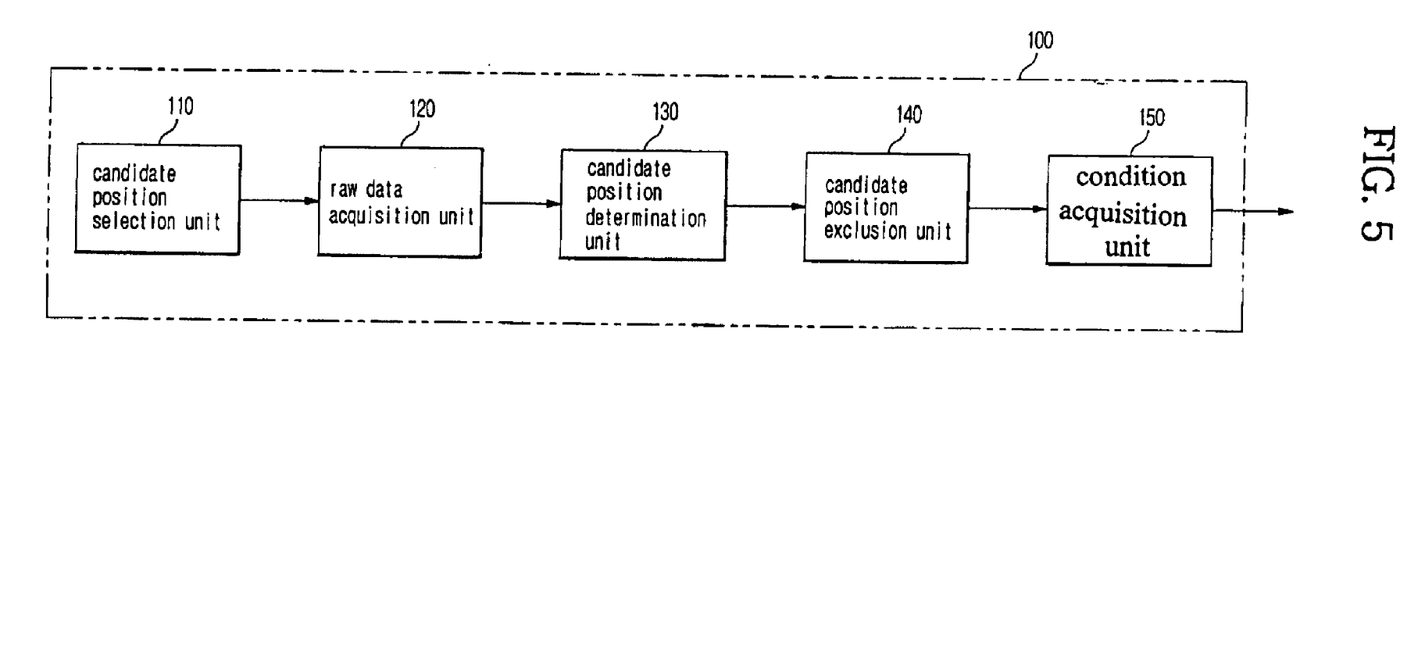
FIG. 5 is a view illustrating a magnetic field condition setting unit of FIG. 4.

FIG. 5 is a view illustrating the magnetic field condition setting unit 100 of FIG. 4 including a candidate position selection unit 110, a raw data acquisition unit 120, a candidate position determination unit 130, a candidate position exclusion unit 140, and a condition acquisition unit 150.

The candidate position selection unit 110 selects a candidate position at a location which is expected to receive little or no magnetic field interference (e.g., a location which is remotely spaced apart from a wall, a pillar, metal, etc.), as a calibration position at which to calibrate the plurality of compasses. The candidate position selection unit 110 may select a group of candidate positions at which to calibrate the plurality of compasses with respect to corresponding magnetic fields at each of the candidate positions in the group of candidate positions.

The raw data acquisition unit 120 rotates the plurality of compasses or the moving object on which the plurality of compasses are installed at a current candidate position, and obtains a trajectory of raw data to acquire a horizontal component of the earth's magnetic field $H_x$ and a vertical component of the earth's magnetic field $H_y$ at the current candidate position. The raw data acquisition unit 120 then obtains calibration parameters including, for example, amplitudes $A_x$ and $A_y$ and offsets $O_x$ and $O_y$, from the raw data collected by the plurality of compasses.

The candidate position determination unit 130 determines that the current candidate position satisfies the EMF conditions if the trajectory of the raw data collected therefrom approximates a sinusoidal waveform. On the other hand, if the trajectory of the raw data is remarkably different from the sinusoidal waveform, the candidate position determination unit 130 produces a summation of other calibration positions in the group of candidate positions (not including the current candidate positions).

The candidate position exclusion unit 140 compares amplitudes and/or offsets (i.e., the calibration parameters) of the magnetic fields at each of the candidate positions in the group of candidate positions with one another, and excludes candidate positions with outlier data points from the summation of the group of candidate positions. The amplitudes and offsets of the magnetic fields at each of the candidate positions that are included in the summation of the group of candidate positions may have a 95% reliability.

The condition acquisition unit 150 obtains upper and lower limits of the amplitudes and the offsets of the magnetic fields of the candidate positions in the group of candidate positions $^1A_{xu}$, $^1A_{xl}$, $^2A_{xu}$, $^2A_{xl}$ and $^1A_{yu}$, $^1A_{yl}$, $^2A_{yu}$, $^2A_{yl}$, and determines the EMF conditions based on the obtained upper and lower limits.

Figure 6:
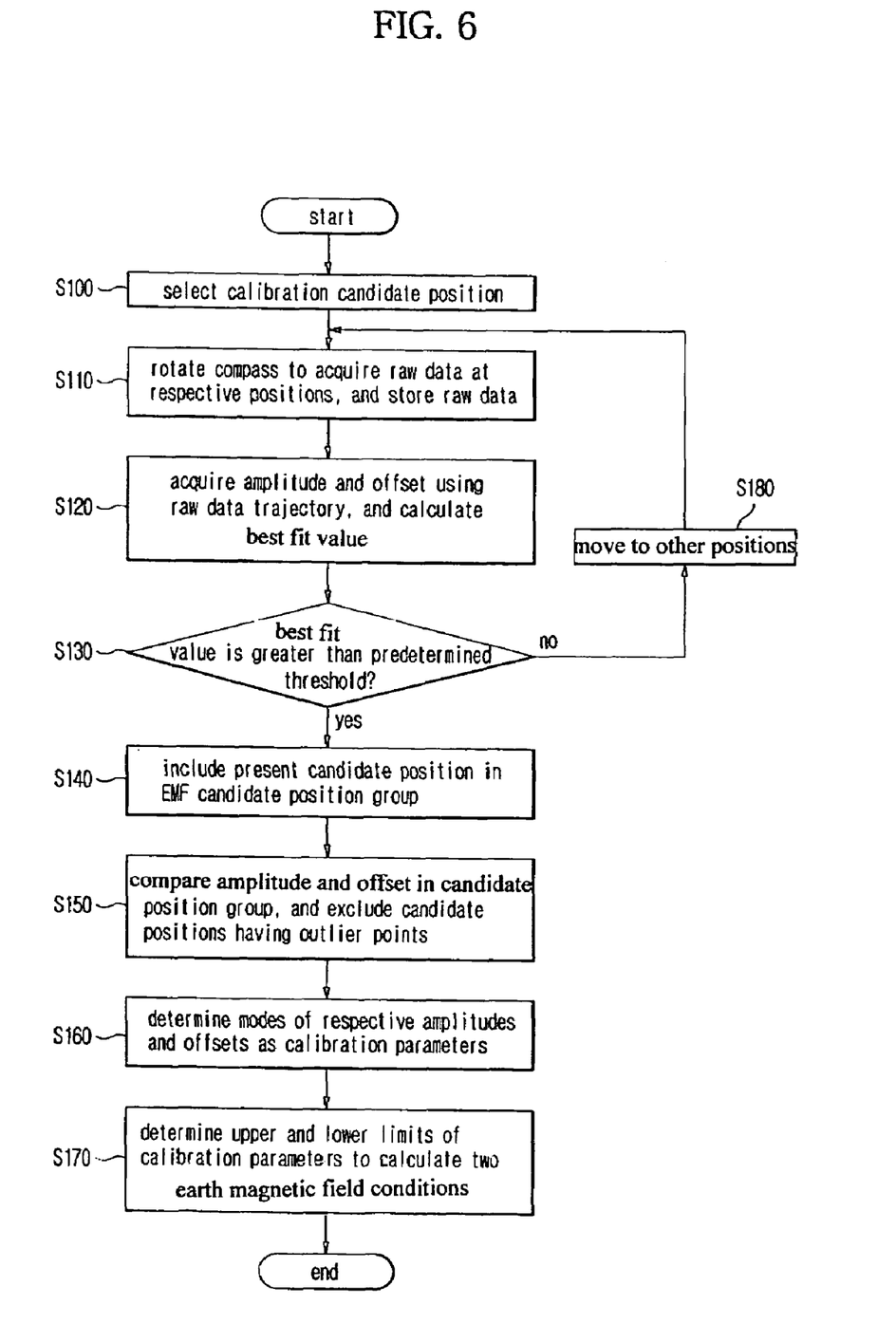
FIG. 6 is a flowchart illustrating a statistical calibration method according to an embodiment of the present general inventive concept.

FIG. 6 is a flowchart illustrating a statistical calibration method according to an embodiment of the present general inventive concept. The statistical calibration method obtains calibration parameters of the plurality of compasses such that problems caused by distortion of the calibration parameters due to magnetic field interference are resolved, and the calibration parameters are used to determine the EMF conditions for the magnetic determination unit 200.

The statistical calibration method may be performed off-line. Calibration of the plurality of compasses is a procedure used to acquire the calibration parameters including an amplitude and an offset. The calibration parameters can further include a scale factor, which can change binary raw data into azimuth data.

Figure 7:
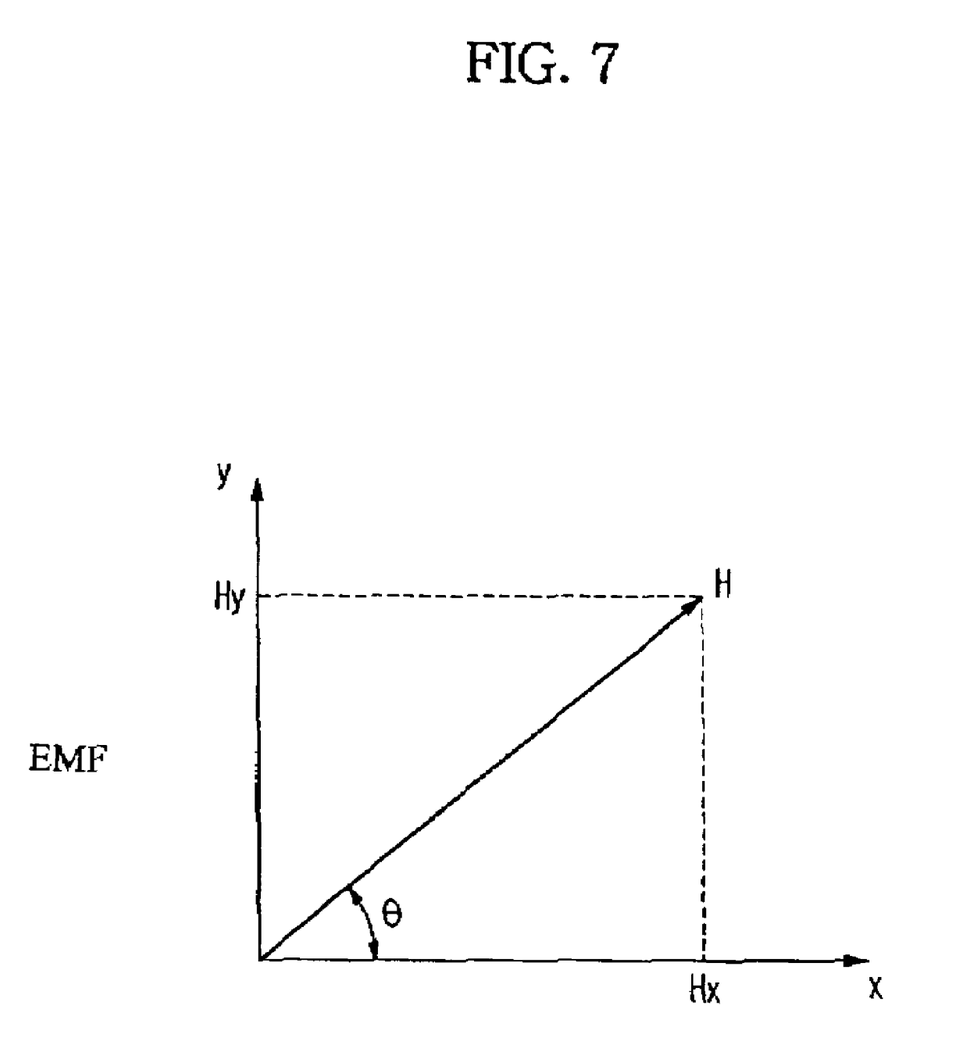
FIG. 7 is a graph illustrating a data collection procedure used to acquire an azimuth using the earth's magnetic field H.

FIG. 7 is a graph illustrating a data collection procedure used to acquire an azimuth data using the Earth's magnetic field H. As illustrated in FIG. 7, arctangent values based on the EMF components $H_x$ and $H_y$, each of which corresponds to x-and y-direction are determined by the plurality of compasses to obtain the azimuth data. The EMF components $H_x$ and $H_y$ can be calculated from raw data of the compasses $r_x$ and $r_y$ (each of which has a range of 0~65536 for a 16-bit system) obtained through the data collection procedure.

The data collection procedure of the plurality of compasses is divided into three stages:
1) Rotation of either the plurality of compasses or the moving object on which the plurality of compasses are installed;
2) Acquisition of three or more raw data from the plurality of compasses;
3) Calculation of scale factors, amplitudes, and/or offsets from limits of the acquired raw data.

For example, if raw data have a minimum $r_{min}$ and a maximum $r_{max}$, the EMF components are expressed by the following equation (1):

$$H_x = |H_E|(r_x - o_x)/(r_{xmax} - r_{xmin})$$
$$H_y = |H_E|(r_y - o_y)/(r_{ymax} - r_{ymin}) \quad (1)$$

Here, $o_x$, $o_y$ denote offsets, in which $o_x = 0.5(r_{xmax} + r_{xmin})$ and $o_y = 0.5(r_{ymax} + r_{ymin})$, and $|H_E|$ denotes a magnitude of the EMF.

During a conventional calibration procedure, an internal magnetic field interference of the moving object can be compensated for, but errors due to an external magnetic field interference cannot be compensated for. Therefore, in order to obtain accurate calibration parameters when performing the conventional calibration procedure, the compasses must be calibrated in the EMF area (i.e., an area with little or no magnetic field interference from external sources).

The conventional calibration procedure has disadvantages in that, if raw data collected by the compasses has a maximum and a minimum which are statistically meaningless outlier data points as a result of magnetic field interference, distorted calibration parameters are obtained. As a result, distorted azimuths are calculated.

The statistical calibration method illustrated in FIG. 6 overcomes the above mentioned problems and searches for a location where there is little or no magnetic field interference so that the data collection procedure is not affected by magnetic field interference from an external source. Further, the method of the embodiments of FIG. 6 use the EMF conditions determined by examining data collected at a plurality of candidate positions to determine whether the moving object is in the EMF area. In other words, the method characterizes raw data obtained in the EMF area in order to be able to subsequently determine whether raw data collected by the plurality of compasses is likely valid (i.e., meets the characterization).

A place which is expected to receive little or no magnetic field interference (e.g., a location which is remotely apart from a wall, a pillar, metal, etc.) is first selected as a candidate position at which to calibrate the plurality of compasses in operation S100.

Once the candidate position is selected in operation S100, the plurality of compasses and/or the moving object to which the plurality of compasses are installed are rotated at a constant speed at the selected candidate position in order to acquire raw data used to obtain a horizontal component of a magnetic field $H_x$ at the selected candidate position and a vertical component of the magnetic field $H_y$ at the selected candidate position in operation S110. The acquired raw data is also stored in the operation S110.

Figure 8:
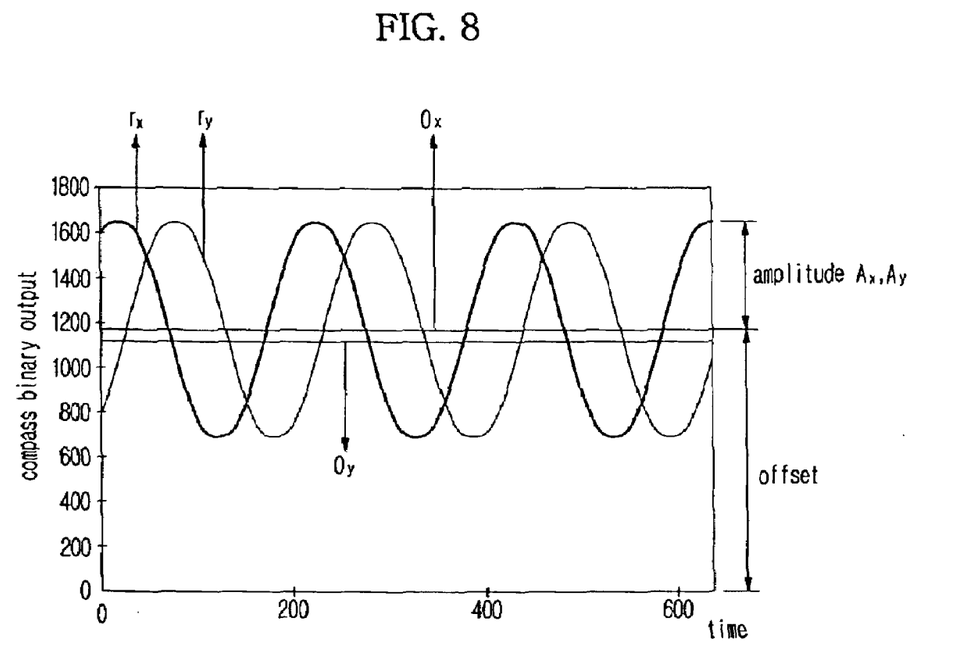
FIG. 8 is a trajectory of raw data obtained according to the calibration method of FIG. 6.

A trajectory of the stored raw data approximates a sinusoidal waveform as illustrated in FIG. 8. From the trajectory, the calibration parameters (i.e., amplitudes $A_x$ and $A_y$ and offsets $O_x$ and $O_y$) are obtained by a Chi-square curve fitting for the following equations (2-1) and (2-2) in operation S120.

$$r_x(t) = O_x + A_x \cos \omega t + e_x(t) \quad (2\text{-}1)$$
$$r_y(t) = O_y + A_y \sin(\omega t + \epsilon_\rho) + e_y(t) \quad (2\text{-}2)$$

Here, $e_x(t)$ and $e_y(t)$ are terms that represent errors, such as a speed error, a motion tracing error, a measurement error, a tilt error, and a magnetic field interference, etc. $\epsilon_\rho$ denotes a phase error, $A_x$ and $A_y$ denote the amplitudes, and $O_x$ and $O_y$ denote the offsets.

After acquiring the calibration parameters using equations (2-1) and (2-2) at each of the candidate positions in the group of candidate positions using the Chi-square curve fitting, a best-fit value (e.g., a range of parameter) is calculated and compared with a predetermined threshold in operation S130.

If the best-fit value is less than the predetermined threshold, a determination is made that a present candidate position is not in the EMF area and the present candidate position is not included in the group of candidate positions. Other candidate positions are then checked at operation S180 to determine whether the other candidate positions should be included in the group of candidate positions according to whether corresponding best fits are less than the predetermined threshold.

On the other hand, if the best-fit value is greater than or equal to the predetermined threshold, the present candidate position is included in the summation of the group of candidate positions at operation S140.

Here, the best-fit value is a scale factor indicating how the trajectory of the raw data approximates a curve expressed in equations (2-1) and (2-2). Therefore, the greater the best-fit value, the lower the magnetic field interference.

Once the group of candidate positions is determined, amplitudes and offsets of the magnetic fields at each of the candidate positions are compared with each other in the summation of the groups of candidate positions. Any candidate positions having outlier data points are excluded from the summation of the group of candidate positions at operation S150. The candidate positions that are included in the summation of the group of candidate positions have a 95% reliability.

Modes of each amplitude and each offset, maximum and minimum, are then determined as a calibration parameter at operation S160.

Additionally, upper and lower limits of the amplitudes, $^1A_{xu}$, $^1A_{xl}$, $^2A_{xu}$, $^2A_{xl}$ and $^1A_{yu}$, $^1A_{yl}$, $^2A_{yu}$, $^2A_{yl}$, which are present in the summation of the group of candidate positions are determined in order to calculate the EMF conditions in operation S170. The operation S170 is described in more detail below.

Since a difference between the offsets of the magnetic fields at the candidate positions in the summation of the group of candidate positions is not large, the present embodiment is described with reference to a difference between amplitudes of the magnetic fields at each candidate position without regard to the difference between offsets. Although the present embodiment is described with reference to the difference between amplitudes, it should be understood that the present general inventive concept may be applied using the difference of the offsets.

As illustrated in FIG. 6, the statistical calibration method according to this embodiment resolves problems associated with magnetic field interference and outlier data points, such that precise and reliable calibration parameters can be provided. Additionally, statistical distribution information obtained while the statistical calibration method is performed can be applied to determine the EMF conditions of the plurality of magnetic compasses.

When an azimuth is calculated using only the plurality of magnetic compasses, it may be difficult to determine whether the azimuth is calculated in the EMF area or the magnetic field interference area. However, the magnetic field determination unit 200 (see FIG. 4) of the present general inventive concept uses the EMF conditions to determine whether the plurality of magnetic compasses are located in the EMF area, and determines an orientation of the moving object accordingly.

Once the raw data is obtained using the plurality of compasses, a magnitude of the magnetic field at the current candidate position can be determined using the following equation (3).

$$|H|^2 = \left(\frac{r_x - O_x}{\hat{A}_x} \times |H_E|\right)^2 + \left(\frac{r_y - O_y}{\hat{A}_y} \times |H_E|\right)^2 \quad (3)$$

Here, $\hat{A}_x$ and $\hat{A}_y$ denote the amplitudes of the calibration parameters obtained through the statistical calibration method. On the other hand, when using the upper and lower limits, the amplitudes can be expressed by the following equations (4-1) and (4-2) with 95% reliability.

$$A_{yl} \leq A_y^{true} \leq A_{yu} \quad (4\text{-}1)$$

$$A_{xl} \leq A_x^{true} \leq A_{xu} \quad (4\text{-}2)$$

Here, $A_y^{true}$ and $A_x^{true}$ are unknown values that are true values of the amplitudes in the EMF area. Since the offsets are almost constant regardless of the candidate positions at which the plurality of compasses are calibrated, the offsets are assumed to be constant and do not affect the equations (4-1) and (4-2).

Uncertainty in the amplitudes typically occurs as a result of one or more of the following: weak magnetic field interference is present in the EMF area, a difference between a rotation axis of the compass and a rotation axis when performing calibration motion increases magnetic field interference, or there are errors such as a measurement error, a tracing error of rotation motion, bottom non-uniformity, etc. Since the uncertainty typically affects the x- and y-axes of the compass equally, the following equation (5) can be assumed:

$$\frac{A_x^i - A_{xl}}{A_{xu} - A_{xl}} = \frac{A_y^i - A_{yl}}{A_{yu} - A_{yl}} \text{ for all } i \quad (5)$$

Here, i denotes an index of a calibration position in the summation of the group of candidate positions. From equation (5), a statistical distribution of x- and y-amplitudes of the summation of the group of candidate positions can be expressed by an approximate linear equation (6).

$$A_y^i \cong a A_x^i + b \text{ for all } i \quad (6)$$

Here, $a \cong (A_{yu} - A_{yl})/(A_{xu} - A_{xl})$, $b \cong (A_{yl} A_{xu} - A_{xl} A_{yu})/(A_{xu} - A_{xl})$.

Since it is expected that the true values of the amplitudes will also follow a statistical distribution similar to that of equation (6), the following equation (7) is also valid.

$$A_y^{true} \cong a A_x^{true} + b \quad (7)$$

Thus, when a first compass and a second compass are symmetrically installed on a single moving object, calibration parameters from the first and second compasses are valid in equations (6) and (7). Therefore, the statistical distribution of amplitudes of the first and second compasses, which are calculated from the summation of the group of candidate positions, is expressed by following equations (8-1) and (8-2).

$$^2A_x^i \cong \alpha_x\, ^1A_x^i + \beta_x \quad (8\text{-}1)$$

$$^2A_y^i \cong \alpha_y\, ^1A_y^i + \beta_y \quad (8\text{-}2)$$

Here, $\alpha_x$, $\beta_x$, $\alpha_y$, and $\beta_y$ are defined in the same manner as a and b of equation (6). Similarly, since it is expected that the true values of each compass follow the statistical distribution of equation 6, the following equations (9-1) and (9-2) are also valid.

$$^2A_y^{true} \cong \alpha_y\, ^1A_y^{true} + \beta_y \quad (9\text{-}1)$$

$$^2A_x^{true} \cong \alpha_x\, ^1A_x^{true} + \beta_x \quad (9\text{-}2)$$

In order to derive the EMF conditions, new unknown variables $\psi_y \equiv A_y^{true}/\hat{A}_y$ and $\psi_x \equiv A_x^{true}/\hat{A}_x$ and safety margins $\gamma_x$ and $\gamma_y$ are defined. From the definition of the new unknown variables and the safety margins, the following equations (10-1) and (10-2) can be derived.

$$\frac{A_{xl}}{\hat{A}_x} - \gamma_x \leq \psi_x \leq \frac{A_{xu}}{\hat{A}_x} + \gamma_x \text{ or } \psi_{xl} \leq \psi_x \leq \psi_{xu} \quad (10-1)$$

$$\frac{A_{yl}}{\hat{A}_y} - \gamma_y \leq \psi_y \leq \frac{A_{yu}}{\hat{A}_y} + \gamma_y \text{ or } \psi_{yl} \leq \psi_y \leq \psi_{yu} \quad (10-2)$$

Based on experimental results, the safety margins $\gamma_x$ and $\gamma_y$ may be values between 0.1 and 0.2.

A first EMF condition can be obtained by the following:

If the plurality of magnetic compasses are at a location where the EMF is dominant with little or no magnetic field interference (i.e., the EMF area), the following equation (11) may be derived from equation (3).

$$\left(\frac{r_x - O_x}{A_x^{true}}\right)^2 + \left(\frac{r_y - O_y}{A_y^{true}}\right)^2 = 1. \quad (11)$$

An azimuth θ can be obtained by expressing equations (11) and (3) as the following equation (12).

$$|H|^2/|H_E|^2 = (\psi_x \sin^2 \theta + \psi_y \cos^2 \theta) \quad (12)$$

Here, the azimuth θ is determined to be $$\theta^{true} = \arctan\left(\frac{A_y^{true}(r_x - O_x)}{A_x^{true}(r_y - O_y)}\right)$$

under an assumption that the compasses are located at a location in the EMF area. Equation (12) can be expressed by the following equation (13).

$$|H|^2/|H_E|^2 = \frac{1}{2}(\psi_x + \psi_y + (\psi_y - \psi_x)\cos 2\theta) \quad (13)$$

When equations (10) and (7) are applied to equation (13), the following equation (14) can be obtained.

$$(\psi_{l+} + \psi_{l-} \cos 2\theta)/2 \leq |H|^2/|H_E|^2 \leq (\psi_{u+} + \psi_{u-} \cos 2\theta)/2 \quad (14)$$

Here, $\psi_{l+} \equiv \psi_{xl} + \psi_{yl}$, $\psi_{u+} \equiv \psi_{xu} + \psi_{yu}$, and $\psi_{l-} \equiv \min(\psi_{yl} - \psi_{xl}, \psi_{yu} - \psi_{xu})$, $\psi_{l+} \equiv \max(\psi_{yl} - \psi_{xl}, \psi_{yu} - \psi_{xu})$.

The azimuth θ denotes a measurement value. When the first and second compasses are located in the EMF area the first EMF condition, which is represented in equation 14, is satisfied.

Since equation (14) should be valid with respect to the first and second compasses, if such a condition is applied thereto, a second EMF condition can be obtained from the following equation (15) with respect to a difference between amplitudes of the magnetic fields from the first and second compasses.

$$(\overline{\psi}_{l+} + \overline{\psi}_{l-}\cos 2\theta)/2 \leq (|^1H|^2 - |^2H|^2)/|H_E|^2 \leq (\overline{\psi}_{u+} + \overline{\psi}_{u-}\cos 2\theta)/2 \quad (15)$$

Here, $\overline{\psi}_{l+} = \min(^1\psi_x - ^2\psi_x) + \min(^1\psi_y - ^2\psi_y)$
$\overline{\psi}_{u+} = \max(^1\psi_x - ^2\psi_x) + \max(^1\psi_y - ^2\psi_y)$, and
$\overline{\psi}_{l-} = \min(^1\psi_y - ^2\psi_y, -^1\psi_x + ^2\psi_x)$,
$\overline{\psi}_{u-} = \max(^1\psi_y - ^2\psi_y, -^1\psi_x + ^2\psi_x)$.

The azimuth θ is a measurement value of the first compass and/or the second compass, which are produced when a predetermined value is selected. If the measurement values of the first compass and the second compass are different from each other, the first condition will not be satisfied.

Operation of the magnetic field determination unit 200 (see FIG. 4) that determines whether the moving object is in the EMF area using the EMF conditions is described in detail with reference to FIG. 9.

Figure 9:
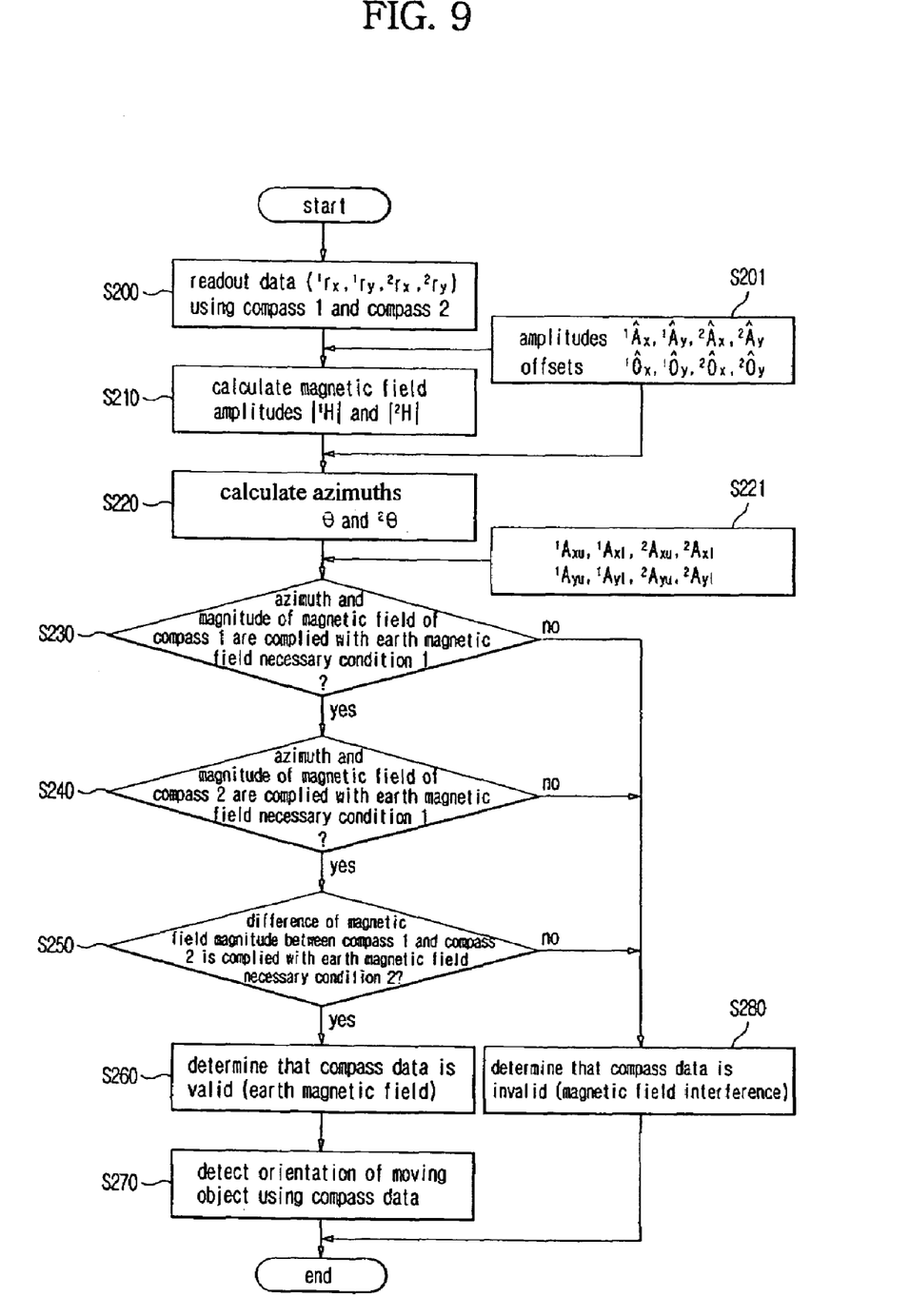
FIG. 9 is a flowchart illustrating a method of determining an orientation of a moving object according to whether the moving object is in an area without substantial magnetic field interference according to an embodiment of the present general inventive concept.

FIG. 9 is a flowchart illustrating a method of determining an orientation of a moving object according to whether the moving object is in an area without substantial magnetic field interference, according to an embodiment of the present general inventive concept. In particular, FIG. 9 illustrates a method of determining whether azimuths from the plurality of compasses are valid using EMF conditions obtained off-line when an object is moving.

Although the EMF conditions are satisfied, it is not always possible to determine whether the moving object is in the EMF area. However, the magnetic field determination unit 200 (see FIG. 4) of the present general inventive concept can determine whether a compass is presently located in the EMF area within a high probability, based on the EMF conditions.

The magnetic field determination unit 200 determines the magnetic field on-line.

First, raw data $^1r_x$, $^1r_y$, $^2r_x$, $^2r_y$ is collected in real time using first and second compasses in operation S200.

The raw data from each of the first and second compasses is obtained and the calibration parameters can be determined off-line using the statistical calibration method of FIG. 6. The calibration parameters are provided in operation S201. Magnitudes of magnetic fields of the first and second compasses $|^1H|$ and $|^2H|$ is calculated according to equation (3) in operation S210. Once the magnitudes of the magnetic fields $|^1H|$ and $|^2H|$ of the first and second compasses are calculated, azimuths of the first and second compasses, $^1\theta$ and $^2\theta$ are calculated using equation (12) in operation S220.

The calculated azimuth $^1\theta$, the magnitude of the magnetic field $|^1H|$ of the first compass, the upper and lower limits of the amplitude $^1A_{xu}$, $^1A_{xl}$, $^2A_{xu}$, $^2A_{xl}$, and $^1A_{yu}$, $^1A_{yl}$, $^2A_{yu}$, $^2A_{yl}$, and the offset, respectively, which are obtained using the statistical calibration method of FIG. 6 are used, in operation S221, to determine whether the azimuth $^1\theta$ and the magnitude of the magnetic field $|^1H|$ of the first compass satisfy the first EMF condition obtained by equation (14) in operation S230. If the azimuth $^1\theta$ and the magnitude of the magnetic field $|^1H|$ of the first compass satisfy the first EMF condition, a determination is made as to whether the calculated azimuth $^2\theta$ and a magnitude of the magnetic field $|^2H|$ of the second compass satisfies the first EMF condition, obtained by equation (14), in operation S240.

If the azimuths $^1\theta$ and $^2\theta$ and the magnitudes of the magnetic fields $|^1H|$ and $|^2H|$ of both the first compass and the second compass satisfy the first EMF condition, a difference between the magnitudes of the magnetic fields $|^1H|$ and $|^2H|$ of the first compass and the second compass are obtained in order to determine whether the difference between the magnitudes of the magnetic fields $|^1H|$ and $|^2H|$ satisfies the second EMF condition obtained in equation (15) in operation S250.

If the difference between the magnitudes of the magnetic fields $|^1H|$ and $|^2H|$ of the first compass and the second compass satisfies the second EMF condition, a determination is made that a present location of the moving object is within the EMF area and that azimuths $^1\theta$ and $^2\theta$ of the first and second compasses are valid in operation S260.

Once the azimuths $^1\theta$ and $^2\theta$ of the first and second compasses are determined to be valid, an orientation of the moving object is determined using the azimuths $^1\theta$ and $^2\theta$ of the first and second compasses in operation S270.

In operation S280, if any one of the azimuths $^1\theta$ and $^2\theta$ and the magnitudes of the magnetic fields $|^1H|$ and $|^2H|$ of the first compass and the second compass fail to satisfy the first EMF condition, or if the difference between the magnitudes of magnetic fields $|^1H|$ and $|^2H|$ of the first compass and the second compass do not comply with the second EMF condition, a determination is made that the moving object on which the first and second compasses are installed is located in the magnetic field interference area and that the azimuths $^1\theta$ and $^2\theta$ of the first and second compasses are invalid. It is to be noted that although the embodiments of the present general inventive concept refer to an EMF area and a magnetic field interference area, there may be more than one EMF area and/or more than one magnetic field interference area. Further, the EMF area simply refers to an area where there is little or no magnetic field interference to interfere with the earth's magnetic field. Similarly, the magnetic field interference area refers to an area where magnetic field interference from an external source has a substantial presence.

Although the embodiments of the present general inventive concept refer to the first and second EMF conditions to determine whether a present position of a moving object is in an EMF area or in the magnetic field interference area, other EMF conditions may also be used in addition to the first and second conditions. Furthermore, the magnetic field determination unit described in the embodiments of the present general inventive concept may determine the magnetic field using any one of the first and second EMF conditions.

Figure 10:
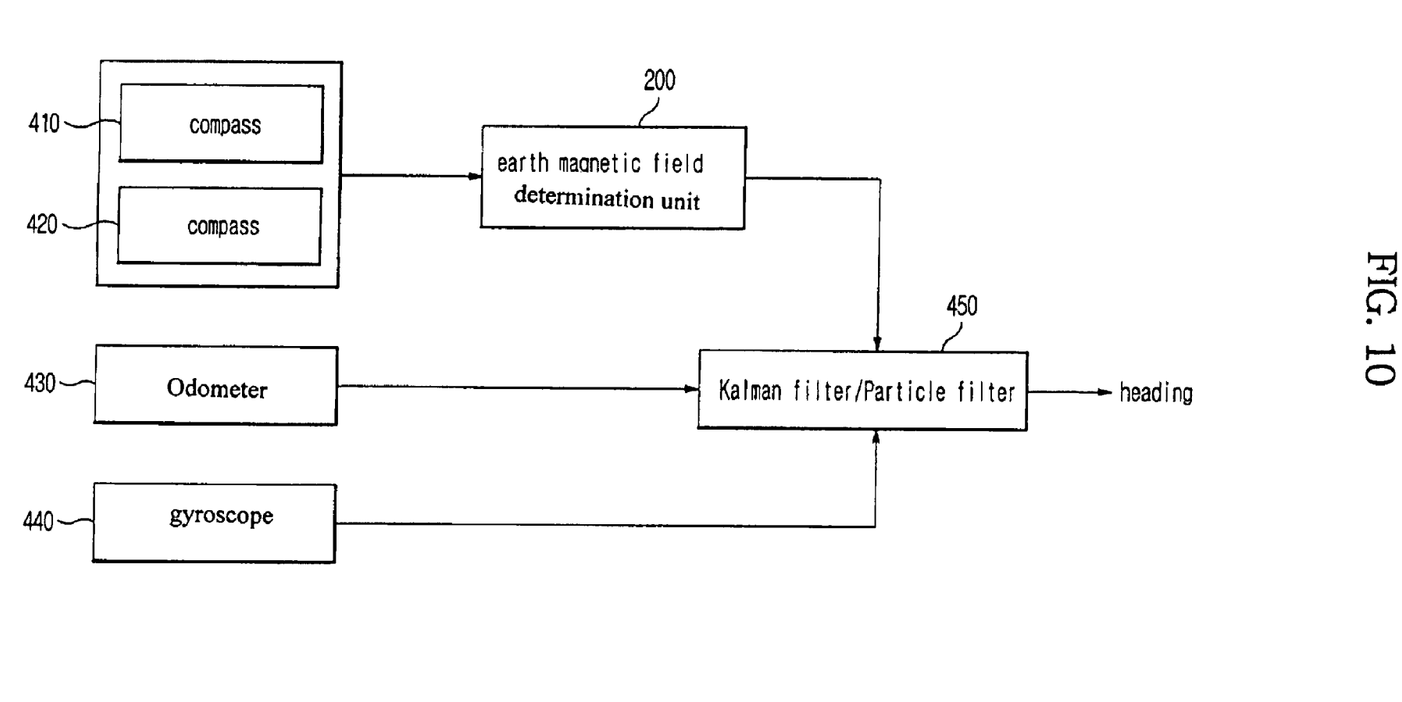
FIG. 10 is a block diagram illustrating a system to detect an orientation of a moving object according to an embodiment of the present general inventive concept.

FIG. 10 is a block diagram illustrating a system to detect an orientation of a moving object according to another embodiment of the present general inventive concept. The system of FIG. 10 uses sensed information obtained by a combined sensor, including first and second magnetic compasses 410 and 420, an odometer 430 as a relative sensor, and a gyroscope 440. The first and second magnetic compasses 410 and 420, the odometer 430, and the gyroscope 440 aid a magnetic field determination unit 200 (similar to 200 in FIG. 4) to precisely and reliably determine the orientation of the moving object.

The magnetic field determination unit 200 performs a determination that azimuths from the first and second magnetic compasses 410 and 420 are valid based on a determination of whether data of the first and second magnetic compasses 410 and 420 is valid. A Kalman filter/Particle filter 450 can reliably determine the orientation of the moving object according to the determination of the magnetic field determination unit 200 and the sensed information obtained by the combined sensor (including the first and second magnetic compasses 410 and 420, the odometer 430, and the gyroscope 440).

The embodiments of the present general inventive concept may be embodied in a computer by running a program from a computer-readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The embodiments of the present general inventive concept may be embodied as a computer-readable medium having a computer-readable program code to cause a number of computer systems connected via a network to effect distributed processing.

The methods and systems according to the various embodiments of the present general inventive concept can minimize magnetic interference in a space where an object is moving, using magnetic field information and angle information obtained from compasses, such that an orientation of the moving object can be precisely detected.

The methods and systems according to the various embodiments of the present general inventive concept can check whether a present position of the moving object is in an EMF area, and can determine the orientation of the moving object based on azimuths of the magnetic compasses, if the present position of the moving object is in the EMF area, such that the moving object can recognize its present position and control its movement based on the recognition.

In addition, the methods and systems according to the various embodiments of the present general inventive concept can be applied to mobile communication devices.

Although various embodiments of the present general inventive concept have been shown and described, it should be appreciated by those skilled in the art that changes may be made in these embodiments without departing from the principles and spirit of the general inventive concept, the scope of which is defined in the claims and their equivalents.

What is claimed is:

1. A method of detecting an orientation of a moving object on which one or more magnetic compasses are installed, the method comprising:
    setting one or more earth magnetic field (EMF) conditions without a magnetic field interference component to determine whether the one or more magnetic compasses are located in an EMF area;
    calculating a magnitude of a magnetic field applied to the moving object using the one or more magnetic compasses; and
    detecting an orientation of the moving object by determining whether the calculated magnitude of the magnetic field satisfies the one or more EMF conditions.

2. The method as set forth in claim 1, wherein the setting of the one or more EMF conditions comprises:
    obtaining trajectories of a horizontal component $H_x$ and a vertical component $H_y$ of a plurality of magnetic fields by rotating the one or more magnetic compasses in a plurality of corresponding positions in the EMF area;
    obtaining one or more parameters to approximate the trajectories as a sinusoidal curve; and
    calculating the one or more EMF conditions by obtaining upper and lower limits of the one or more parameters.

3. The method as set forth in claim 2, wherein the one or more parameters include amplitudes of the approximated sinusoidal curve.

4. The method as set forth in claim 2, wherein the one or more EMF conditions include a plurality of EMF conditions, and if the plurality of EMF conditions are satisfied by the calculated magnitude of the magnetic field, data of the one or more magnetic compasses are determined to be valid and then the orientation of the moving object is determined.

5. The method as set forth in claim 4, wherein the one or more magnetic compasses include two or more magnetic compasses.

6. The method as set forth in claim 4, wherein the data of the one or more magnetic compasses is determined to be invalid if any one of the plurality of EMF conditions is not satisfied.

7. The method as set forth in claim 4, wherein the plurality of EMF conditions comprises a first condition set to be compared to azimuths of the one or more magnetic compasses and magnitudes of the magnetic fields of the one or more magnetic compasses and defined by the following equation (1), and a second condition set to be compared to a difference between magnitudes of the one or more magnetic compasses and defined by the following equation (2), $$(\psi_{l+}+\psi_{l-}\cos 2\theta)/2 \leq |H|^2/|H_E|^2 \leq (\psi_{u+}+\psi_{u-}\cos 2\theta)/2 \quad (1)$$

wherein, $\psi_{l+}\equiv\psi_{xl}+\psi_{yl}, \psi_{u+}\equiv\psi_{xu}+\psi_{yu}$ and $\psi_{l-}\equiv\min(\psi_{yl}-\psi_{xl},\psi_{yu}-\psi_{xu}), \psi_{l+}\equiv\max(\psi_{yl}-\psi_{xl},\psi_{yu}-\psi_{xu})$, and $\theta$ is an azimuth measurement value, $$(\overline{\psi}_{l+}+\overline{\psi}_{l-}\cos 2\theta)/2 \leq (|^1H|^2-|^2H|^2)/|H_E|^2 \leq (\overline{\psi}_{u+}+\overline{\psi}_{u-}\cos 2\theta)/2 \quad (2)$$

where, $\overline{\psi}_{l+}\equiv\min(^1\psi_x-^2\psi_x)+\min(^1\psi_y-^2\psi_y)$,
$\overline{\psi}_{u+}\equiv\max(^1\psi_x-^2\psi_x)+\max(^1\psi_y-^2\psi_y)$,
$\overline{\psi}_{l-}\equiv\min(^1\psi_y-^2\psi_y-^1\psi_x+^2\psi_x)$, and
$\overline{\psi}_{u-}\equiv\max(^1\psi_y-^2\psi_y-^1\psi_x+^2\psi_x)$, and $\theta$ is the azimuth measurement value.

8. The method as set forth in claim 1, wherein the magnitude of the calculated magnetic field is obtained by the following equation (3) using the one or more magnetic compasses $$|H|^2 = \left(\frac{r_x - O_x}{\hat{A}_x} \times |H_E|\right)^2 + \left(\frac{r_y - O_y}{\hat{A}_y} \times |H_E|\right)^2, \quad (3)$$

where, $\hat{A}_x$ and $\hat{A}_y$ are amplitude values, $O_x$ and $O_y$ are offset values, $r_x$ and $r_y$ are raw data values of the one or more magnetic compasses, and $|H_E|$ denotes magnitude of the earth's magnetic field.

9. A method of detecting an orientation of a moving object, the method comprising:
    collecting calibration magnetic field data from a plurality of locations in an earth magnetic field (EMF) area; and characterizing the collected calibration magnetic field data and setting one or more rules to define when the moving object is in the EMF area according to a current magnetic field data.

10. The method as set forth in claim 9, wherein the EMF area comprises at least one space having minimal or no magnetic field interference, and the collecting of the calibration magnetic field data comprises:
    estimating the plurality of locations in the EMF area;
    calculating a plurality of magnetic fields at the plurality of locations in the EMF area;
    determining a plurality of calibration parameters that correspond with the plurality of magnetic fields; and
    selecting ones of the plurality of calibration parameters that are determined to approximate the earth's magnetic field to set the one or more rules accordingly.

11. The method as set forth in claim 9, further comprising:
    collecting current magnetic field data about a first magnetic field with a first compass disposed on the moving object;
    collecting current magnetic field data about a second magnetic field with a second compass disposed on the moving object;
    determining whether the current magnetic field data of the first and second magnetic fields satisfy the one or more rules; and
    detecting the orientation of the moving object according to the current magnetic field data of the first and second magnetic fields when it is determined that the current magnetic field data of the first and second magnetic fields satisfy the one or more rules.

12. The method as set forth in claim 11, wherein the characterizing of the collected magnetic field data and the setting of the one or more rules comprises:
    creating a first rule to be satisfied by the magnetic field data of both the first and second magnetic fields; and
    creating a second rule to be satisfied by a difference between the magnetic field data of the first and second magnetic fields.

13. The method as set forth in claim 11, wherein the detecting of the orientation further comprises setting an azimuth of one of the first and second compasses as the orientation of the moving object.

14. A method of detecting an orientation of a moving object, the method comprising:
    collecting magnetic field data at a present location of the moving object;
    determining whether the collected magnetic field data satisfies one or more predetermined rules that define when the moving object is in an earth magnetic field (EMF) area; and
    detecting the orientation of the moving object according to the collected magnetic field data when the collected magnetic field data satisfies the one or more predetermined rules.

15. A system to detect orientations of a moving object on which one or more magnetic compasses are installed, comprising:
    a magnetic field condition setting unit to set one or more conditions of an earth magnetic field (EMF) without a magnetic field interference component to determine whether the one or more magnetic compasses are located in an EMF area;
    a magnetic field calculation unit to calculate a magnitude of a magnetic field applied to the moving object using the one or more magnetic compasses;
    an earth magnetic field area determination unit to determine whether the calculated magnitude of the magnetic field satisfies the one or more EMF conditions and to determine whether a position of the moving object is in the EMF area; and
    an orientation determining unit to determine an orientation of the moving object based on one or more azimuths of the one or more magnetic compasses if the position of the moving object corresponds to the EMF area.

16. The system as set forth in claim 15, wherein the magnetic field condition setting unit comprises:
    a candidate position selection unit to select one or more candidate positions in which corresponding magnetic fields have little or no magnetic field interference component;
    a raw data acquisition unit to obtain one or more parameters by obtaining a raw data trajectory of the corresponding magnetic fields having a horizontal component $H_x$ and a vertical component $H_y$ by rotating the one or more magnetic compasses at the one or more selected candidate positions;
    a candidate position determination unit to determine a current compass position as a candidate position that satisfy the one or more EMF conditions when the corresponding trajectory of raw data approximates a sinusoidal wave and to generate a candidate position group based on a result of the determination; and
    a condition acquisition unit to determine upper and lower limits obtained at each candidate position in the candidate position group and to determine the one or more EMF conditions.

17. The system as set forth in claim 16, wherein the candidate position determination unit compares amplitudes and offsets at each of the one or more selected candidate positions with one and another and excludes one or more candidate positions having outlier points from the candidate position group based on a result of the comparison.

18. The system as set forth in claim 15, wherein the one or more magnetic compasses include two or more magnetic compasses.

19. The system as set forth in claim 15, wherein the one or more EMF conditions include a plurality of EMF conditions, and the EMF area determination unit determines that the position of the moving object corresponds to the EMF area without the magnetic field interference component if the magnitude of the magnetic field satisfies all of the plurality of EMF conditions, and determines that the position of the moving object does not correspond to the EMF area if the magnitude of the magnetic field fails to satisfy any one of the plurality of EMF conditions.

20. A system to detect an orientation of a moving object, comprising:
    a magnetic field calculation unit to collect calibration magnetic field data from a plurality of locations in an earth magnetic field (EMF) area; and
    a magnetic field condition setting unit to characterize the collected calibration magnetic field data and to set one or more rules to define when the moving object is in the EMF area according to a current magnetic field data.

21. The system as set forth in claim 20, wherein the magnetic field calculation unit collects current magnetic field data about a first magnetic field with a first compass disposed on the moving object and collects current magnetic field data about a second magnetic field with a second compass disposed on the moving object, and the system further comprises:

an earth magnetic field area determination unit to determine whether the current magnetic field data of the first and second magnetic fields satisfy the set one or more rules; and an orientation determination unit to determine the orientation of the moving object according to the current magnetic field data of the first and second magnetic fields when it is determined that the current magnetic field data of the first and second magnetic fields satisfy the set one or more rules.

22. A system to detect an orientation of a moving object, comprising:

a magnetic field calculation unit to collect magnetic field data at a present location of the moving object;

a magnetic field comparison unit to determine whether the collected magnetic field data satisfies one or more predetermined rules that define when the moving object is in an earth magnetic field (EMF) area; and an orientation determination unit to detect the orientation of the moving object according to the collected magnetic field data when the collected magnetic field data satisfies the one or more predetermined rules.

* * * * *